United States Patent [19]

Allen

[11] 4,226,354
[45] Oct. 7, 1980

[54] PORTABLE DISPOSABLE RACK FOR AN AUTOMOBILE

[76] Inventor: Robert R. Allen, 1512 Arlington La., Schaumburg, Ill. 60193

[21] Appl. No.: 13,216

[22] Filed: Feb. 21, 1979

[51] Int. Cl.² ............................................. B60R 9/04
[52] U.S. Cl. .................................. 224/318; 224/327
[58] Field of Search ............... 224/309, 311, 318, 322, 224/327, 329, 315, 325; 105/472, 473, 471, 469, 466, 467; 280/179 R, 179 A

[56] References Cited

U.S. PATENT DOCUMENTS

| 2,409,946 | 10/1946 | MacLeod | 224/318 |
| 2,635,796 | 4/1953 | Davolt | 224/42.46 R UX |
| 3,132,780 | 5/1964 | Binding | 224/315 |
| 3,902,641 | 9/1975 | Peasley | 224/318 |

FOREIGN PATENT DOCUMENTS

| 1127972 | 12/1956 | France | 224/311 |
| 1131259 | 2/1957 | France | 224/311 |
| 302350 | 12/1954 | Switzerland | 224/327 |

*Primary Examiner*—Robert J. Spar
*Assistant Examiner*—Jerold M. Forsberg
*Attorney, Agent, or Firm*—Trexler, Wolters, Bushnell & Fosse, Ltd.

[57] ABSTRACT

An inexpensive rack which is mounted on the roof of an automobile. Other objects are then mounted on the rack for transport with the automobile. The rack is an elongate lamination including a pair of opposed soft foamed outer layers, and an inner reinforcing layer therebetween. The reinforcing layer extends outwardly of the soft layers defining end tabular portions which are sandwiched between the car roof and the opposing doors to secure the rack to the vehicle. In a preferred embodiment, a pair of racks are mounted in spaced relation across the automobile roof. An object positioned thereon is secured to the automobile by conventional means of rope, straps, or the like.

9 Claims, 4 Drawing Figures

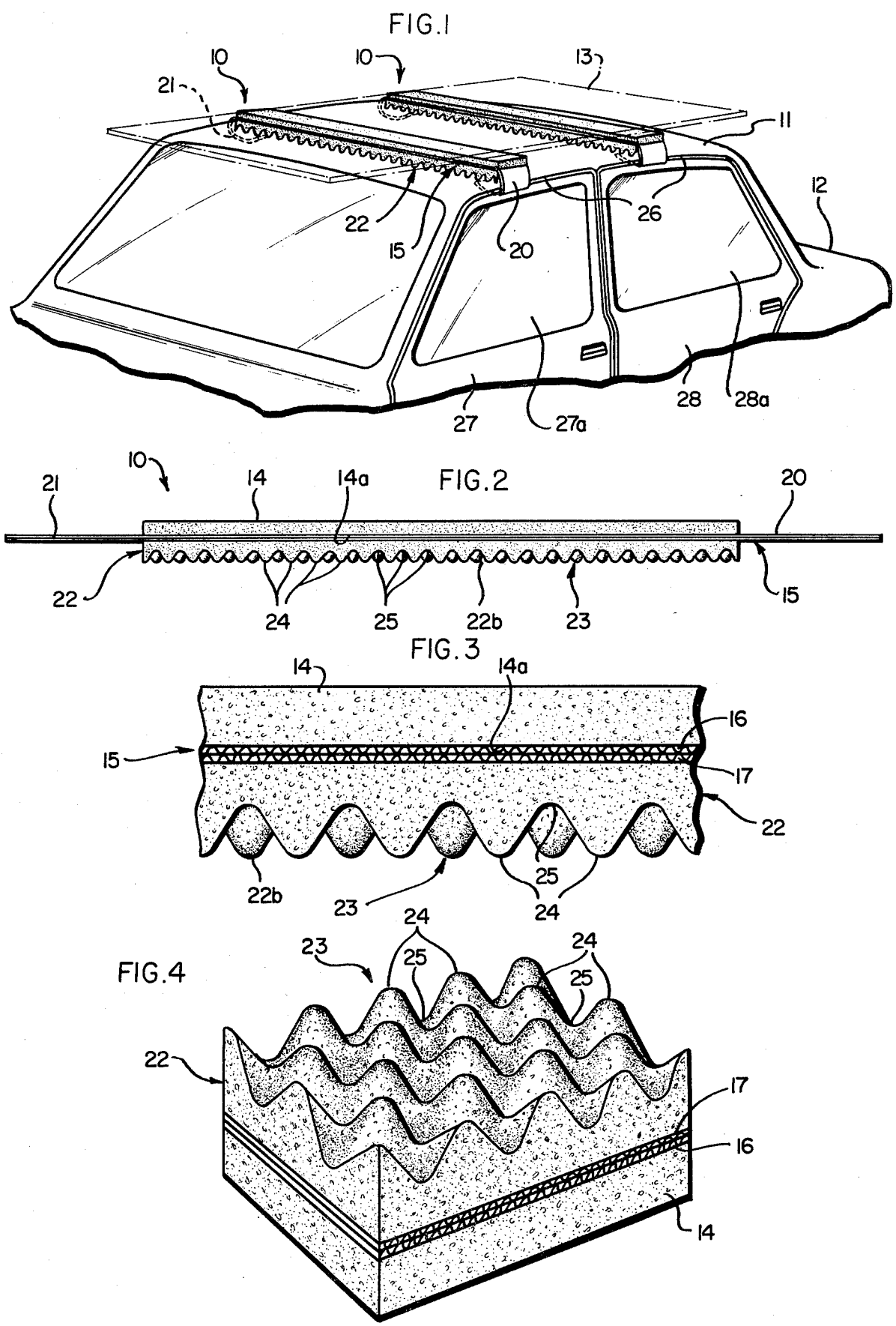

PORTABLE DISPOSABLE RACK FOR AN AUTOMOBILE

BACKGROUND OF THE INVENTION

This invention relates generally to a portable rack which is adapted to be mounted on the roof of an automobile. The rack protects both the roof and objects which are to be mounted on the rack and transported by the automobile. More specifically, the invention is directed to an elongate lamination of opposing outer foam layers and an inner reinforcing layer. The lamination may be positioned across the roof of an automobile from one side thereof to the other and secured thereto by positioning exposed distal end portions of the reinforcing layer between the roof and respective opposing doors or windows of the automobile. With one, or preferably two of the elongate laminations positioned on an automobile roof, large items such as building materials, furniture, or the like may be positioned on top of the rack and secured to the automobile by ropes or similar material.

Heretofore, portable racks adapted to be mounted on an automobile have usually been made of metal materials which are secured to the vehicle by tie down members and rubber pads. Such portable racks are relatively expensive, and do not lend themselves to economical disposal after they are used. Rental services frequently carry an inventory of such portable racks because their initial cost is too high to justify a purchase when they are used only infrequently. Further, such storage racks need considerable storage space.

One type of inexpensive portable car rack which is known consists of an elongate triangular corrugated cardboard tube. This tube, or a pair of such tubes, may be stretched across the width of an automobile roof and materials may be transported on the roof on top of the tubes. However, the corrugated cardboard material, especially in a triangular configuration, is not sufficiently supple or bendable to conform to the shape of the automobile roof, or the object to be transported, and only provides an insecure mounting for the object. Further, the triangular tubes do not adhere in any manner to the roof of the automobile in order to prevent displacement of the tubes as an object is positioned thereon.

It is therefore an object of the invention to provide a portable car top rack which is inexpensive to produce and which provides superior stability for mounting objects thereon.

Another object of the invention is the provision of a portable car rack which is so inexpensive to be produced that it may be discarded after it has performed its function only once, or a few number of times.

Another object of the invention is the provision of an inexpensive portable car top rack which includes fastening means integrally formed therewith for securing the rack to an automobile on which it is to be mounted.

SUMMARY OF THE INVENTION

Applicant's invention is directed to an improved portable rack adapted to be mounted on an automobile for positioning objects thereon. The rack includes an elongate lamination adapted to extend generally horizontally across the automobile from one side thereof to the other. The lamination includes opposing outer layers of soft sponge-like material and an inner layer of reinforcing material laminated between the outer layers. The reinforcing layer has greater structural rigidity than the outer layers across the narrow width of the elongate lamination.

The invention is further directed to an elongate portable top car rack adapted to be mounted in pairs across the roof of an automobile fron one side thereof to the other. The car rack includes a corrugated cardboard strip, the strip being of length sufficient to extend across the width of an automobile and including opposed tabular end portions adapted to be bent backwardly of the remainder of the strip for mounting between the roof and the opposing side doors of the automobile. The rack further includes a pair of elongate foamed polyurethane sheets. One sheet is laminated to each of the respective opposing surfaces of the cardboard strip. Each of the polyurethane sheets has a thickness substantially greater than the cardboard strip. The sheets are shorter than the cardboard strip and laminated substantially centrally along the length of the strip for allowing the tabular portions to extend outwardly of the foamed sheets.

BRIEF DESCRIPTION OF THE DRAWINGS

The features of the present invention, which are believed to be novel, are set forth with particularity in the appended claims. The invention may best be understood by reference to the following desciption of two currently preferred embodiments taken in connection with the accompanying drawings, wherein like reference numerals identify like elements throughout, and in which:

FIG. 1 is a fragmentary perspective view of an automobile showing the car top rack of the invention in mounted position on the roof thereof with a large object positioned on top of the rack;

FIG. 2 is a side elevational view of the car top rack shown in FIG. 1;

FIG. 3 is an enlarged fragmentary detail view of a portion of the elevational view of the car top rack shown in FIG. 2; and FIG. 4 is an enlarged detail perpective view of an egg-crate shape surface on one side of the car top rack of the invention.

DETAILED DESCRIPTION OF THE INVENTION

Referring to FIG. 1, a pair of car top racks of the invention, generally indicated at 10—10, are shown mounted across the roof 11 of an automobile 12 in a preferred mounting position for carrying large objects on top thereof, such as a large sheet 13 of material, shown in outline.

As shown most clearly in FIG. 2, each rack 10 is an elongate laminated structure which includes an elongate top sheet 14 of foamed or expanded material, having substantially flat rectangular surfaces defining an elongate rectangular polyhedron. Expanded polystyrene or foamed polyurethane are preferred materials for the foamed sheets. The bottom surface 14a of foamed sheet 14 (shown most clearly in FIG. 3) is adhered to a central reinforcing member, generally indicated at 15, of which corrugated cardboard is a preferred material, although plastic materials may be utilized. As shown most clearly in FIG. 3, the pair of corrugated cardboard strips 16, 17, are laminated together to form a double strength reinforcing member 15. The corrugated cardboard strips are of standard construction having flat top and bottom sheets positioned in spatial relation between a central sheet which is of wavy or undulating shape. The three sheets of material are laminated together to form a single member, and two of these members 16, 17 are laminated together to form the double strength reinforcing strip 15.

As shown most clearly in FIG. 2, the length of the central corrugated cardboard reinforcing strip 15 is greater than the length of the top elongate foamed sheet 14. The foamed sheet 14 is positioned centrally along the length of corrugated strip 15 and defines two distal end tabular portions 20, 21, respectively, the function of which will be discussed below.

A second sheet of foamed or expanded material, generally indicated at 22, which preferably has the same length and width as foamed sheet 14, is laminated to the bottom surface of reinforcing member 15 in alignment with the top foamed sheet. Bottom foamed sheet 22 has the same width and length as top foam sheet 14, and has a generally flat rectangular top surface which is adhered to the reinforcing member 15.

While the side and end surfaces of bottom sheet 22 are generally flat, the bottom portions 22b of same have a wavy outline which is defined by an egg-crate undulatory bottom sheet surface, generally indicated at 23 in FIG. 4. The undulatory surface 23 consists of a plurality of aligned peak portions 24—24 positioned in spatial relation in between each of which are positioned one of concave valley portions 25—25, thus providing an evenly distributed undulatory surface. The undulatory surface 23 is generally believed to provide greater adhering qualities between the car top rack 10 and the roof 11 of an automobile when the rack is mounted thereon. It is believed that the differences in roof pressure on the peaks 24 and valleys 25 as the undulating surface 23 is mounted thereon provide a greater temporary adhering quality between car top rack 10 and the roof 11. This greater adhering quality tends to keep the car top rack in its mounted position on the roof 11 when an object, such as sheet 13 shown in FIG. 1, is drawn across the top surface of the car rack as the object is positioned on the roof.

In operation, as shown most clearly in FIG. 1, it is preferred that a pair of car top racks 10 be positioned in spatial relation across the top of the roof 11 of an automobile 12. The bottom egg-crate like surface 23 is positioned against the automobile rooftop, and the racks 10—10 are centered across the roof 11 from one side thereof to the other. Next, the tabular end portions 20, 21 are bent downwardly and backwardly of the remainder of the sheet and positioned in the door wells 26 defining the bottom of roof 11. Next, the respective front car door 27 and back door 28 on both sides of the automobile (one side not shown) are closed to secure the respective tabular portions, 20, 21, firmly between the roof 11 and respective car doors 27, 28. It can be appreciated that the cardboard tabular portions 20, 21 may also be secured to the automobile by opening the respective door windows 27a, 28a, and inserting the tabular portion therein and closing the respective windows on the tabular portions.

With car top rack 10—10 thus secured to the automobile roof 11, a variety of large objects, such as sheet 13, may be positioned on top of the car racks without the fear of damaging either the object 13 or the automobile roof 11. When the object 13 is centered on the car rack 10—10, conventional means, such as ropes, tie down straps, or the like may be utilized to secure the object 13 to the automobile 12 for transportation of the object with the automobile. One advantage of the car top racks 10 of the invention is that they are so inexpensive to produce that they may be discarded if used just once. Unlike more costly car top racks, it is not necessary for an individual owning the racks to store them when not in use to justify their expense. Because of the low expense in production of the car top racks of the invention, it is believed that retail stores, such as lumber yards, appliance stores, furniture stores, or the like could easily maintain a supply of the portable car racks for use by purchasers of their products when the products are to be transported on top of the purchaser's automobile. After the purchaser has transported the object to a desired location, the car top racks could then be discarded without any substantial financial loss.

For many applications of the car top carrier, it may not be necessary to provide the rack with an undulatory bottom surface such as shown at 23 in FIG. 4. In applications where such a bottom surface is not necessary, the carrier can be produced at an even lower cost. The operation of such a modified carrier is substantially identical to the operation of the car top rack 10 shown in FIG. 1.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

I claim:

1. A portable disposable rack adapted to be mounted on an automobile roof for positioning objects thereon, said rack comprising:
   an elongate lamination adapted to extend generally horizontally across said automobile from one side thereof to the opposing side thereof, said lamination including,
   soft, elastically deformable opposing outer layers, and
   a reinforcing layer laminated between said outer layers, and said reinforcing layer having greater structural rigidity than said outer layers across the narrow width of said elongate lamination and having end portions extending beyond said outer layers for deformable, fastening location between automobile doors or door windows and the corresponding door frames or door window frames.

2. The portable rack defined in claim 1 wherein
   an outer surface of at least one of said outer layers is undulatory.

3. The portable rack defined in claim 1 wherein
   said outer layers are made of polyurethane foam.

4. The portable rack defined in claim 1 wherein
   said outer layers are made of expanded polystyrene.

5. The portable rack defined in claim 1 wherein said reinforcing inner layer is made of corrugated cardboard.

6. The portable rack defined in claim 1 wherein
   said reinforcing inner layer is made of plastics material.

7. A portable disposable car rack structure mountable across the roof of an automobile from one side thereof to an opposing side thereof, said car rack structure comprising:
   a corrugated cardboard strip, said strip being of length sufficient to extend across the roof of an automobile and including opposed tabular end portions for deformable mounting between opposing side doors or door windows of said automobile and the cooperating door frames or door window frames, a pair of soft, elastically deformable elongate sheets, each laminated to one surface of said cardboard strip, each of said sheets having a thickness substantially greater than said cardboard strip, and said sheets being shorter than said strip and laminated substantially centrally along the length thereof allowing said strip tabular end portions to extend outwardly of said sheets.

8. The portable car rack as defined in claim 7 wherein at least one outer surface of a sheet thereof defines an undulatory surface.

9. The portable car rack as defined in claim 7 wherein said cardboard strip is made of a double corrugation for added strength.

* * * * *